(12) United States Patent
Hussain et al.

(10) Patent No.: US 10,965,964 B2
(45) Date of Patent: Mar. 30, 2021

(54) SYSTEM AND METHODS FOR INTEGRATED MULTISTREAMING OF MEDIA WITH GRAPHICAL OVERLAYS

(71) Applicant: Logitech Europe S.A., Lausanne (CH)

(72) Inventors: Murtaza Hussain, San Francisco, CA (US); Salman Budhwani, San Francisco, CA (US); Ali Moiz, San Francisco, CA (US)

(73) Assignee: Logitech Europe S.A., Lausanne (CH)

( * ) Notice: Subject to any disclaimer, the term of this patent is extended or adjusted under 35 U.S.C. 154(b) by 131 days.

(21) Appl. No.: 15/899,705

(22) Filed: Feb. 20, 2018

(65) Prior Publication Data

US 2019/0261025 A1    Aug. 22, 2019

(51) Int. Cl.
    *H04N 21/2187*    (2011.01)
    *H04L 29/06*       (2006.01)
    *G06T 11/60*       (2006.01)

(52) U.S. Cl.
    CPC ......... *H04N 21/2187* (2013.01); *G06T 11/60* (2013.01); *H04L 65/605* (2013.01); *G09G 2340/12* (2013.01)

(58) Field of Classification Search
    None
    See application file for complete search history.

(56) References Cited

U.S. PATENT DOCUMENTS

| | | | |
|---|---|---|---|
| 9,620,173 B1 | 4/2017 | Fay | |
| 9,968,856 B1 * | 5/2018 | Ninoles | A63F 13/86 |
| 10,021,458 B1 | 7/2018 | Taylor | |
| 2008/0115178 A1 | 5/2008 | Godin | |
| 2011/0185378 A1 | 7/2011 | Johnson | |
| 2013/0258118 A1 | 10/2013 | Felt | |
| 2014/0223464 A1 * | 8/2014 | Moran | H04N 21/4788 725/12 |
| 2016/0085863 A1 | 3/2016 | Allen | |

(Continued)

OTHER PUBLICATIONS

Brower, Bree. "Restream.io Enables Video Game Live Streamers to Broadcast to Multiple Sites At Once," Posted at < https://www.forbes.com/sites/breebrouwer/2016/08/25/restream-video-game-live-streaming-multicasts/#1d7d5cbc5072>. Aug. 25, 2016. (Year: 2016).*

(Continued)

*Primary Examiner* — Scott B Christensen
(74) *Attorney, Agent, or Firm* — Kilpatrick Townsend & Stockton LLP

(57) ABSTRACT

This present disclosure describes a system and methods for integrated multistreaming of media with graphical overlays. At least one method includes a multistream service and graphical overlays hosted by a server infrastructure; a user configuring both the multistream service and graphical overlays on the server infrastructure; a user playing video games on a computer, using broadcasting software to authenticate with the server infrastructure; the broadcasting software capturing video of the user's computer session; the software retrieving the user's custom graphical overlay from the server infrastructure, encoding the video signal and graphical overlay; the software using the same aforementioned authentication to upload the encoded video to a multistream service, and the multistream service streaming the user's encoded video simultaneously to multiple streaming services.

14 Claims, 9 Drawing Sheets

(56) References Cited

U.S. PATENT DOCUMENTS

| | | |
|---|---|---|
| 2018/0018079 A1 | 1/2018 | Monastyrshyn |
| 2018/0035136 A1* | 2/2018 | Crowe ............. H04N 21/21805 |
| 2018/0139257 A1 | 5/2018 | Ninoles |
| 2018/0183844 A1* | 6/2018 | Danker ............... H04L 65/4076 |
| 2018/0374128 A1 | 12/2018 | Mao |
| 2019/0313146 A1 | 10/2019 | Kakuschke et al. |

OTHER PUBLICATIONS

Non-Final Office Action for U.S. Appl. No. 15/949,468 dated May 2, 2019, 10 pages.

Final Office Action for U.S. Appl. No. 15/949,468 dated Nov. 18, 2019, 15 pages.

* cited by examiner

SYSTEM AND METHODS FOR INTEGRATED MULTISTREAMING OF MEDIA WITH GRAPHICAL OVERLAYS

FIELD OF THE DISCLOSURE

The present disclosure relates to providing different streaming services with video content including video overlays.

BACKGROUND

This present disclosure relates to a system and methods for integrated multistreaming of media with graphical overlays.

The online video industry has grown rapidly since YouTube made it simple to share online videos in 2005. Netflix introduced its streaming video service in 2007, followed by Hulu in 2008. All three services focused on pre-recorded video, also known as Video On Demand ("VOD"), until YouTube introduced YouTube Live in 2008. It marked the first easily accessible implementation of a live streaming video service.

Similarly, video games have evolved from single or multiplayer experiences shared around a single TV to complicated, internet-based multiplayer games that allow hundreds of thousands of players to participate in shared gaming experiences. Fans of video games historically used magazines such as GamePro Magazine to stay abreast of new game releases, uncover otherwise difficult to find game secrets, and to learn how optimize their gameplay. Eventually the medium was replaced by YouTube channels dedicated to video game content.

The popularity of online video game content lead to the founding of a new class of Streaming Services: Twitch, which was founded in 2011, and YouTube Gaming which came online in 2015. These services allowed players to directly broadcast their own gaming experiences to the world. Streaming Services differ from the aforementioned Netflix, Hulu, and YouTube products in that they focus on streaming live video, as opposed to pre-recorded VOD content. Today Twitch serves over 170 million visitors every month, and unlike YouTube's VOD product, which primarily serves short-form video, the average Twitch visitor views over an hour of streaming content. For the purpose of the present invention, the term Streaming Services refers to one or more services designed to stream live video content via a digital channel including, but not limited to, Twitch, YouTube Gaming, Mixer, and Facebook Live.

These extended viewing times are enabled by video game fans' voracious appetite for video game content, and by Streaming Services such as Twitch or YouTube Gaming providing tools to enable users broadcasting their games, the Streamers, to monetize the time they spend streaming their game sessions. These tools include allowing Viewers to sign up for a monthly subscription to the channel of a specific Streamers whose personality or gameplay they enjoy, a chat panel for Viewers to chat with each other and the Streamer, and an extensive application programming interface (API) for developers to build applications that interface with the Streaming Services. Many Streamers are able to make a substantial living through Streaming Services and the ecosystems they have created.

Due to the instantaneous and live nature of video streamed to Streaming Services, it is not possible to edit a video before it goes live using traditional video editing software. To overcome this limitation broadcasting software, such as Open Broadcaster Software ("OBS"), has introduced the ability to use Overlays, which are graphical elements that are added to the Streamer's video immediately prior to the video being encoded and sent to Streaming Services for Viewer consumption. Overlays can consist of static or dynamic images, and they can be stored locally or hosted on a server.

Furthermore, Streaming Services and Streaming Service APIs have enabled an ecosystem of third-party tools that help Streamers monetize their channels beyond Viewer subscriptions. Key features developed by third-party services include facilitating donations (a primary source of income for Streamers), Multistream Services that broadcast a single Streamer's video feed to multiple simultaneous Streaming Services, chat bots that help Streamers engage with and manage their Viewers through the chat pane, and custom Overlays. Said custom Overlays can provide static images, such as decorative video borders, animated graphics that respond in real time to the actions of the Viewers or the game.

An example of a real-time alert includes an animated alert appearing in the Streamer's video feed when a Viewer subscribes, follows, or donates to the Streamer. This allows the Streamer to easily see Viewer monetization events as they occur. It also gives the Viewer a chance at notoriety as their name is displayed in front of potentially millions of other Viewers.

Another example of a real-time alert is a widget system that allows the Streamer to display the chat pane contents directly within the video feed. This allows the Streamer to monitor both the output of their live stream and their Viewer conversations in one place, without having to manually show and hide the chat panel while they are live. These and other alert examples have become integral to the success of Streaming Services, and Viewers have come to expect them from their favorite Streamers.

Streamers may also need to broadcast their signal to multiple platforms in order to increase the amount of Viewers reached and the subsequently revenue the streamer is able to generate while streaming. As of the writing of this patent, a number of inventions have been introduced that address this need. Multistream services such as Restream.io or Switchboard.live provide access to multistreaming infrastructure for Streamers. Access to Multistream Services was heretofore made possible by manually configuring broadcasting software, such as OBS, to send the Streamer's video to said third-party Multistream Service. To begin using the Multistream Service, a Streamer is required to sign up for an account with a Multistream Service provider, then follow instructions from the provider to generate and manually transfer their credentials for the stream to the broadcasting software, where said credentials are often an API key that associates the signal with the user's account in the Multistream Service; the broadcasting software then uploads the stream along with the user's API key to the third-party Multistream Service, which then redirects your stream to multiple Streaming Services. A Streamer could alternatively build their own custom multistreaming server. Note that either solution is in addition to creating an account with the service that generates the Graphical Overlay, which must also generate a custom URL for the user's Graphical Overlay, which must then be manually added to the broadcasting software.

While both approaches functionally work, they require considerable technical know-how, they add extra steps to the process of setting up a stream, thus increasing the number of Streamers who are unable to complete the setup process, or they fail to provide the Streamer with the unique benefits granted by integrating said services. Additionally, because the Server Infrastructure is separated from the Multistream Service, Streamers are limited to using the same Graphical Overlay for each Streaming Service to which they broadcast. While a single overlay might have worked well in the past, Viewers on different Streaming Services may care about different aspects of the stream, and they may only care to be alerted to subscription, follow, and donation events related to the Streaming Service they are currently watching as those notifications often allow them to interact with like-minded Viewers who have also chosen to support their favorite Streamer. Furthermore, it is not possible for a Streamer to conveniently manage both the multistream service connections and their graphical overlays in a single server infrastructure. These are just some of the many reasons a Streamer's audience is better served by graphical overlays that are customizable to each Streaming Service.

SUMMARY

Presently disclosed is a system and methods for integrated multistreaming of media with graphical overlays. In embodiments, the method includes a server infrastructure configured to host a user's custom video overlay on the server infrastructure, said overlay configured to incorporate graphics and/or audio and overlay configuration information for a given video overlay, where said configuration information specifies values for one or more settings that define the application of the image and/or audio of the given video overlay; the user configuring said overlay with text and/or graphics; the server infrastructure configured to receive data from a data API; the graphics configured by the user to respond to one or more predefined API data events; the user saving the overlay configuration to the server infrastructure; server infrastructure producing an image file in response to the predefined API data events as specified in the overlay configuration; the server infrastructure configured to establish communication with one or more streaming services, wherein the streaming services are configured to receive and transmit information; server infrastructure configured to receive from the one or more streaming services API data events generated by viewer input information associated with another user's interaction with the different streaming services; the server infrastructure configured to connect the user's account to the one or more streaming services; the user configuring said streaming service connections on configuration pages presented by the server infrastructure or via settings in the local broadcast software, which would then submit the configurations to the server infrastructure; the server infrastructure being configured to store the user's streaming service connection configuration; the user authenticating to the server infrastructure using local broadcasting software; the broadcasting software retrieving the overlay image from the server; the local broadcasting software encoding video output from the user's computer and the overlay image to produce a video file; the local broadcasting software connecting to a multistream service based on the user's previously-granted authentication to the server infrastructure; the local broadcasting software uploading the encoded video file to the multistream service, which is configured to upload the encoded video file to one or more streaming services as determined in the user's multistream configuration; the streaming service decoding the video file; the streaming service displaying the video for consumption by a plurality of users.

In some embodiments, the local broadcasting software is configured to allow a user to directly connect to multiple streaming services.

In some embodiments, the local broadcast software is configured to allow a user to authenticate to the server infrastructure hosting the graphical overlay in addition to authenticating with a separate multistream service; while an API key simply identifies an account to a multistream service, authentication often includes, yet not limited to, providing a username and password for full access to the user account.

In some embodiments, the independent streaming services are hosted on different servers.

In some embodiments, the user connects a multistream service to their account hosted by the server infrastructure in place of or in addition to connecting independent streaming services.

In some embodiments, the broadcasting software encodes the output of the user's local webcam with the overlay and the video feed.

In some embodiments, the broadcasting software is operated from a self-contained mobile computer, including, but not limited to, a smartphone, augmented or virtual reality equipment.

In some embodiments, the broadcasting software combines media outputs from multiple computers to produce the encoded video file.

In some embodiments, the API data is received from multiple data API sources.

In some embodiments, some or all API data is received from a program operating on the User's local computer, such as the user's video game program.

In some embodiments, the overlay configuration specifies the position, duration, and/or real-time event trigger for determining when the image and/or audio of the given video overlay is applied.

In some embodiments, the video content includes an image of the user's face, wherein the image of the given video overlay is positioned relative to the user's face based on the one or more settings that define the application of the image and/or audio of the given video overlay to the video content.

In some embodiments, some or all API data is received from a computer vision program or artificial intelligence engine operating on the User's computer.

In some embodiments, some or all API data is received from a computer vision program or artificial intelligence engine operating in the server infrastructure.

In some embodiments, some or all API data is received from a computer vision program or artificial intelligence engine operating in the multistream service.

In some embodiments, the multistream service decodes the encoded video file, then encodes the video in formats suitable to one or more streaming services, then uploads the encoded outputs to each corresponding streaming service; the streaming services then decode the video file and display the video for consumption by a plurality of users.

In some embodiments, API data is received from multiple data API sources; one or more data sources are designated to create graphics specific to one or more video streaming services; said graphics are used to create one or more overlay; the encoded output of the video and each overlay are then uploaded by the local broadcasting software to a multistream service, which uploads one or more corresponding encoded outputs to one or more corresponding streaming service.

Also disclosed is a system and methods for integrated multistreaming of media with graphical overlays that includes a server infrastructure configured to host a user's custom video overlays on the server infrastructure, said overlays configured to correspond to one or more streaming service; the user configuring said overlays with text and/or graphics and/or audio and overlay configuration information for a given video overlay, where said configuration information specifies values for one or more settings that define the application of the image and/or audio of the given video overlay; the server infrastructure configured to receive data from one or more data API(s); the graphics configured by the user to generate based on one or more predefined API data events corresponding to one or more streaming services; the user saving the overlay configurations to the server infrastructure, where each overlay configuration corresponds to one or more streaming service; server infrastructure producing one or more image file(s) in response to the predefined API data events as specified in the overlay configuration; the server infrastructure configured to establish communication with one or more streaming services, wherein the streaming services are configured to receive and transmit information; server infrastructure configured to receive from the one or more streaming services API data events generated by viewer input information associated with another user's interaction with the different streaming services; the server infrastructure configured to connect the user's account to the one or more streaming services; the user configuring said streaming service connections on configuration pages presented by the server infrastructure or via settings in the local broadcast software, which would then submit the configurations to the server infrastructure; the server infrastructure being configured to store the user's streaming service connection configuration; the user authenticating to the server infrastructure using local broadcasting software; the local broadcasting software encoding video output from the user's computer to produce a video file; the local broadcasting software connecting to a multistream service based on the user's previously-granted authentication to the server infrastructure; the local broadcasting software uploading the encoded video file to the multistream service; the multistream service retrieving the user's one or more overlay image file(s); the multistream service decoding the encoded video file, then re-encoding a copy of the video file for each retrieved overlay image file(s); the multistream service uploading the re-encoded video file(s) to the correct streaming services based on the graphical overlay included in the video file or metadata correlating the completed video file to its associated streaming service; the streaming service decoding the video file; the streaming service displaying the video for consumption by a plurality of users.

In some embodiments, the generated graphics are customized by the user to be unique to one or more streaming service(s).

In some embodiments, the generated graphics are variants provided by the server infrastructure.

In some embodiments, the overlay configuration specifies the position, duration, and/or real-time event trigger for determining when the image and/or audio of the given video overlay is applied.

BRIEF DESCRIPTION OF THE DRAWINGS

A better understanding of the various disclosed embodiments can be obtained when the following detailed description is considered in conjunction with the attached drawings, in which.

Figure 1A:
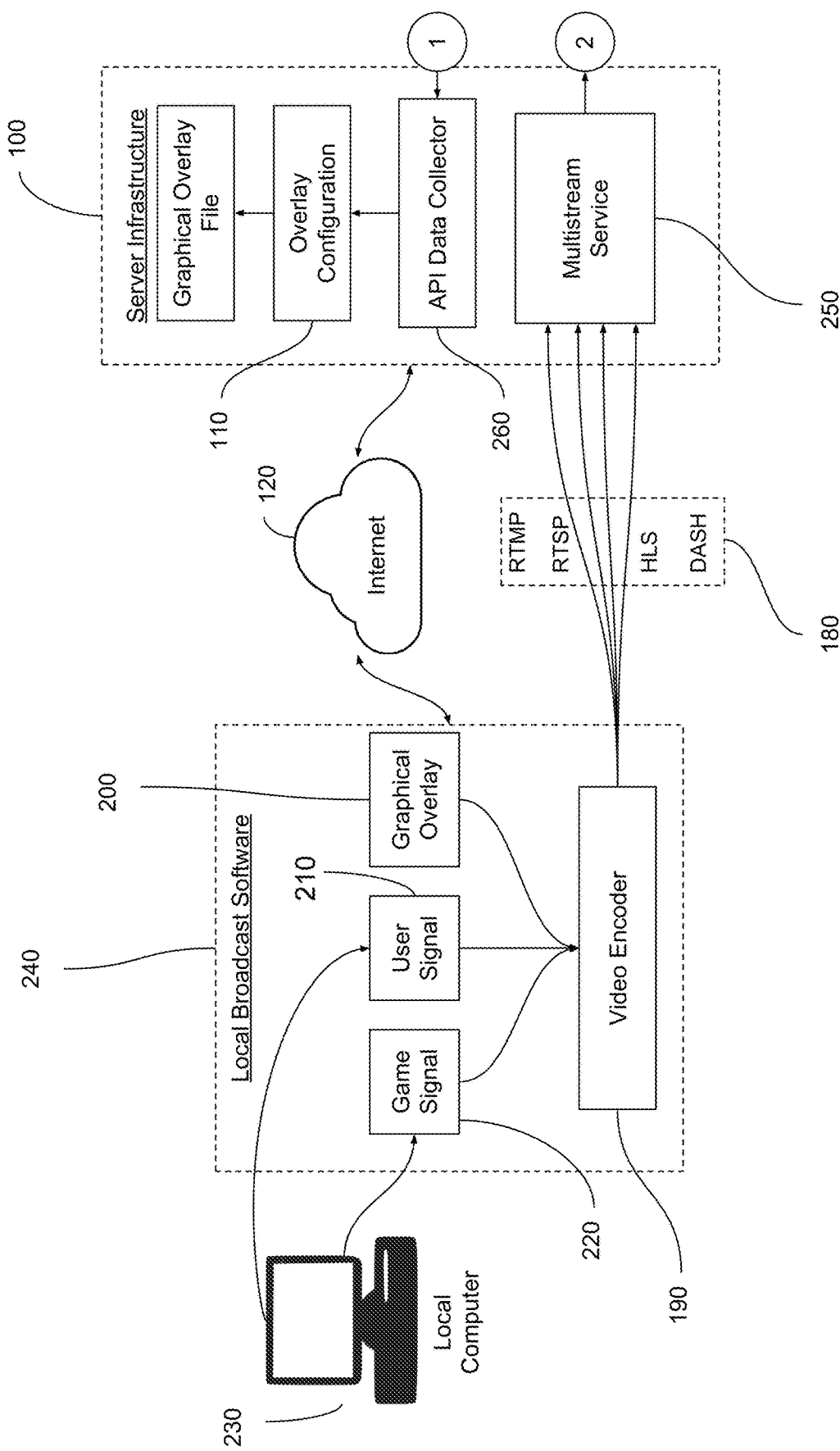
FIGS. 1A and 1B shows a system diagram that includes an illustrative Web Infrastructure with multiple data sources and multistream infrastructure.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Introduction

The disclosed embodiments relate to multistreaming media with graphical overlays for use with video games, movies, entertainment media and/or other non-entertainment media. More specifically, the disclosed embodiments relate to interconnected systems executing software related to local software sending an encoded user signal and dynamically-generated, web-hosted graphical overlay to a service configured to upload videos to one or more streaming services.

The disclosed embodiments rely on a live video streaming architecture, where part of the stream includes inserting a graphical overlay prior to encoding the video for distribution. The user in these embodiments (e.g. the "streamer") configures the graphics that will be generated into a video overlay in real time based on data received from API data sources. The user then connects one or more third-party streaming service to their account, which is stored in the server infrastructure and accessed via the multistream service. The user then authenticates to the server infrastructure through their local broadcast software, which allows the local broadcast software to access services hosted by the server infrastructure, such as the user's generated overlay image and the aforementioned multistream service. The user then configures local broadcast software to combine two or more separate data sources into an encoded video: a specific application or video game signal; the internet-hosted video overlay, which is generated by the server infrastructure at regular intervals to give the appearance that it is animated and synchronized to current events in the application or video game signal; and optionally the user's local camera feed, which, when included, may allow viewers to see the user as they are using their application or playing a video game. The aforementioned signals are then encoded by the local broadcast software for upload to the multistream service; (because the user has already authenticated to the server infrastructure, which contains the multistream service, the local broadcast software already has access to the user's connections in the multistream service) the multistream service then uploads the encoded video to one or more third-party streaming websites, such as Twitch, YouTube Gaming, Mixer, or Facebook Live, based on the user's previously defined connections to said streaming services.

Given that multistream systems and graphical overlays are integral to the monetization of a streamer's channel, and given that streamers typically only receive donations and subscriptions while they are streaming, it is in their best interest to minimize the time they spend managing and customizing the disparate systems required to produce a successful live stream.

In contrast to prior systems, a system for integrated multistreaming of media with graphics makes it seamless for streamers to configure and manage the critical services that comprise their live streams. While an API key allows a multistream service to associate a video with the correct user account, it is not a complete form of authentication, thus does usually not provide sufficient account security to permit the transfer of stored user preferences between a multistream service and a local broadcast software. Fully authenticating with the server infrastructure, often via a username and password, instead of simply sending an API key provides for tighter integration between the server infrastructure and the local broadcast software. This tighter integration allows the server infrastructure to provide the local broadcast software with access to data user preferences, such as the graphical overlay and multistream service configurations; it also allows the local broadcast software to display details from the user's account that would typically only be accessible within the server infrastructure, such as information received by the third-party streaming service data APIs related to the user's connection accounts.

Additionally, by allowing a user to fully authenticate their local broadcast software to a server infrastructure that provides access to both the multistream service and the user's graphical overlays, the disclosed embodiments provide a simple setup experience that is currently unrivaled in the consumer broadcasting market. Not unlike Amazon's one-click checkout invention, this consolidated setup provides a significant competitive advantage to the company that provides the service and the streamers who utilize it.

The paragraphs that follow describe in detail various examples of the above-described embodiments. An example of an illustrative Web infrastructure utilizing dynamic data and multi-streaming infrastructure. The individual use-cases that complete the system (i.e., an individual establishing connections to third-party streaming services and using images to configure an overlay) are then described through software flowcharts. A non-limiting illustrative example of a configured overlay is then provided. Finally two illustrative embodiments are described, wherein the graphical overlay is encoded by the local broadcast software then sent to the multistream service, and the graphical overlay is added to the video after it is received by the multistream service.

Web Infrastructure with Multiple Data Sources and Multistream Infrastructure

Figure 1B:
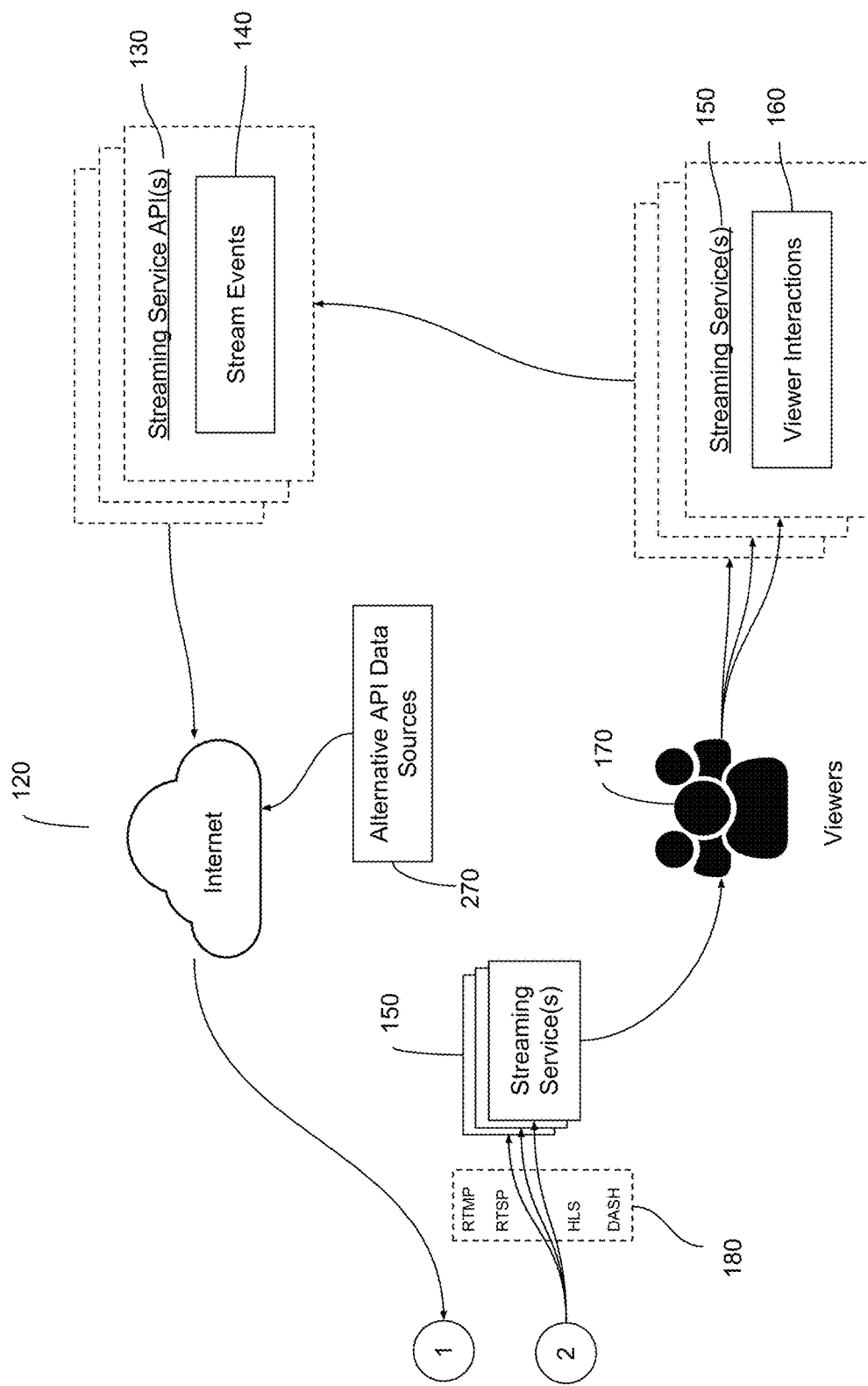

FIGS. 1A and 1B shows an overview of an illustrative embodiment of a web infrastructure with multiple data sources and multistream infrastructure that includes the Server Infrastructure 100, an Internet 120 infrastructure, a Local Computer 230 operating Local Broadcast Software 240, a Multistream Service 250, a Streaming Service 150, Viewers 170, a method for collecting Viewer Interactions 160, and one or more Streaming Service API(s) 130. The Server Infrastructure 100 contains a method for persistent storage, such as a database, as well as a method for initiating and responding to internet requests, such as a web server. The Server Infrastructure 100 stores and makes various user settings available for retrieval, including the user's Overlay Configuration 110 and the user's Graphical Overlay 200. This embodiment potentially includes Alternative API Data Sources 270, which are data sources unrelated to the Streaming Service API(s) 130 that are used in the creation of the Graphical Overlay 200. This embodiment of the Server Infrastructure 100 contains the Multistream Service 250, which stores and maintains the user's connections to third-party Streaming Services 150. This embodiment of the Server Infrastructure 100 also contains an API Data Collector 260, which is responsible for aggregating data from one or more Streaming Service API(s) 130 and Alternative API Data Sources 270. Data gathered by the API Data Collector 260 is then used in combination with the user's Overlay Configuration 110 to populate the Graphical Overlay 200. While not depicted in this embodiment, the Alternative API Data Sources 270 may also be generated by a local program executing on the user's computer.

The Local Computer 230 may be a traditional desktop computer, a laptop, a mobile phone, a virtual or augmented reality computing device, or any related personal computing device. The Streaming Service API(s) 130 and the Alternative API Data Sources 270 connection(s) may be unidirectional or bilateral. The Streaming Service API(s) 130 and the Alternative API Data Sources 270 may also be a RESTful service, a persistent websockets connection, or any other method of regularly publishing and sharing information between disparate internet systems. The Game Signal 220 includes, but is not limited to, an audio/video signal from a videogame, a specific application unrelated to a videogame, or the user's operating system environment including some or all applications the user has executed. Multiple Game Signals 220 and User Signals 210 may also be combined to create the Game Signal 220 or User Signal 210.

In the embodiment shown, the Server Infrastructure 100 responds to requests from the Local Broadcast Software 240 executing on the Local Computer 230, and further retrieves the Overlay Configuration 110 as needed. The Local Software may be stored on a non-volatile information medium, or it may be downloaded onto the Local Computer 230 via, e.g., the Internet 120.

The core functionalities of the Server Infrastructure 100 include, but are not limited to:

1. Responding to requests from the Local Broadcast Software 240, Local Computer 230, or Streaming Service API 130;
2. Hosting a web page that allows users to edit their Overlay Configuration 110;
3. Executing the API Data Collector 260, which may perform, but is not limited to, the following actions:
   a. Maintains persistent connections with the Streaming Service API(s) 230;
   b. Receives data from Alternative API Data Sources 270;
   c. Stores metadata about the data received from the Streaming Service API(s) 230 and Alternative API Data Sources 270;
   d. Stores data aggregated from one or more source related to the user in the user's account;
4. Generating the Graphical Overlay 200 based on the user's Overlay Configuration 110 at set intervals, based on specific data events as they are received in real time by the API Data Collector 260, upon request, or otherwise as needed;
5. Maintaining user account information;
6. Hosting the Multistream Service 250; and
7. Hosting and web sites required to support the disclosed system.

The core functionalities of the Local Broadcast Software 240 include, but are not limited to:

1. Receiving a Game Signal 220 and, optionally, a User Signal 210 from the Local Computer 230;
2. Using the Internet 120 to retrieve the Graphical Overlay 200 from the Server Infrastructure 100;
3. Using the Video Encoder 190 to produce a video file from the Game Signal 220, the optional User Signal 210, and the Graphical Overlay 200;
4. Sending authentication information to the Streaming Service 150 to identify the user uploading the video file;
5. Uploading the video file to a Multistream Service 250 using Streaming Protocols 180;
6. Storing user settings related to, but not limited to:
   a. Streaming Services 150 the user may broadcast their encoded video file;
   b. Encoding settings used to configure and optimize the Video Encoder 190; and
   c. Streaming settings used to configure and optimize the Streaming Protocols 180 used to upload the video file to Streaming Service 150.

The core functionalities of the Multistream Service 250 include, but are not limited to:

1. Storing user configuration settings to control which Streaming Service(s) 150 an uploaded video file should be redistributed to;
2. Optionally receiving authentication information from the Local Broadcast Software 240;
3. If authentication information is received, forwarding said authentication information to one or more Streaming Services 150;
4. Receiving the uploaded video file from the Local Broadcast Service 240 via a Streaming Protocol 180;
5. Optionally decoding the video file, then re-encoding the file to optimize it for individual Streaming Service(s) 150; or
6. Uploading the video file to one or more Streaming Service 150 using a Streaming Protocol 180.

The core functionalities of each of the Streaming Service(s) 150 include, but are not limited to:

1. Storing account details for the user;
2. Receiving authentication information from the Local Broadcast Software 240 and/or the Multistream Service 250;
3. Using the authentication information to identify the user uploading the video file;
4. Receiving the uploaded video file from the Multistream Service 250 via a Streaming Protocol 180;
5. Decoding the video file;
6. Playing the decoded video file for Viewers 170 to consume on the user's channel;
7. Gathering metadata about Viewer Interactions 160 including, but not limited to:
   a. The type of interaction;
   b. The time of the interaction;
   c. The Viewer's 170 account details; and
8. Storing Viewer Interactions 160 for retrieval by the Streaming Service API(s) 140.

The core functionalities of the Streaming Service API(s) 130 include, but are not limited to:

1. Retrieving Viewer Interactions 160 for processing;
2. Processing Viewer Interactions 160 into Stream Events 140 formatted for use in the Streaming Service API(s) 130;
3. Sending the Stream Events 140 to the API Data Collector 260 via the Streaming Service API(s) 130.

The primary implementations of the Alternative API Data Sources 270 include, but are not limited to:

1. Data received directly from the videogame;
2. Data received from a computer vision and/or an artificial intelligence engine analysis of the game;
3. Data received from third-party APIs related to the user's game, the user, or the Viewers 170.

Configuring an Overlay

Figure 2:
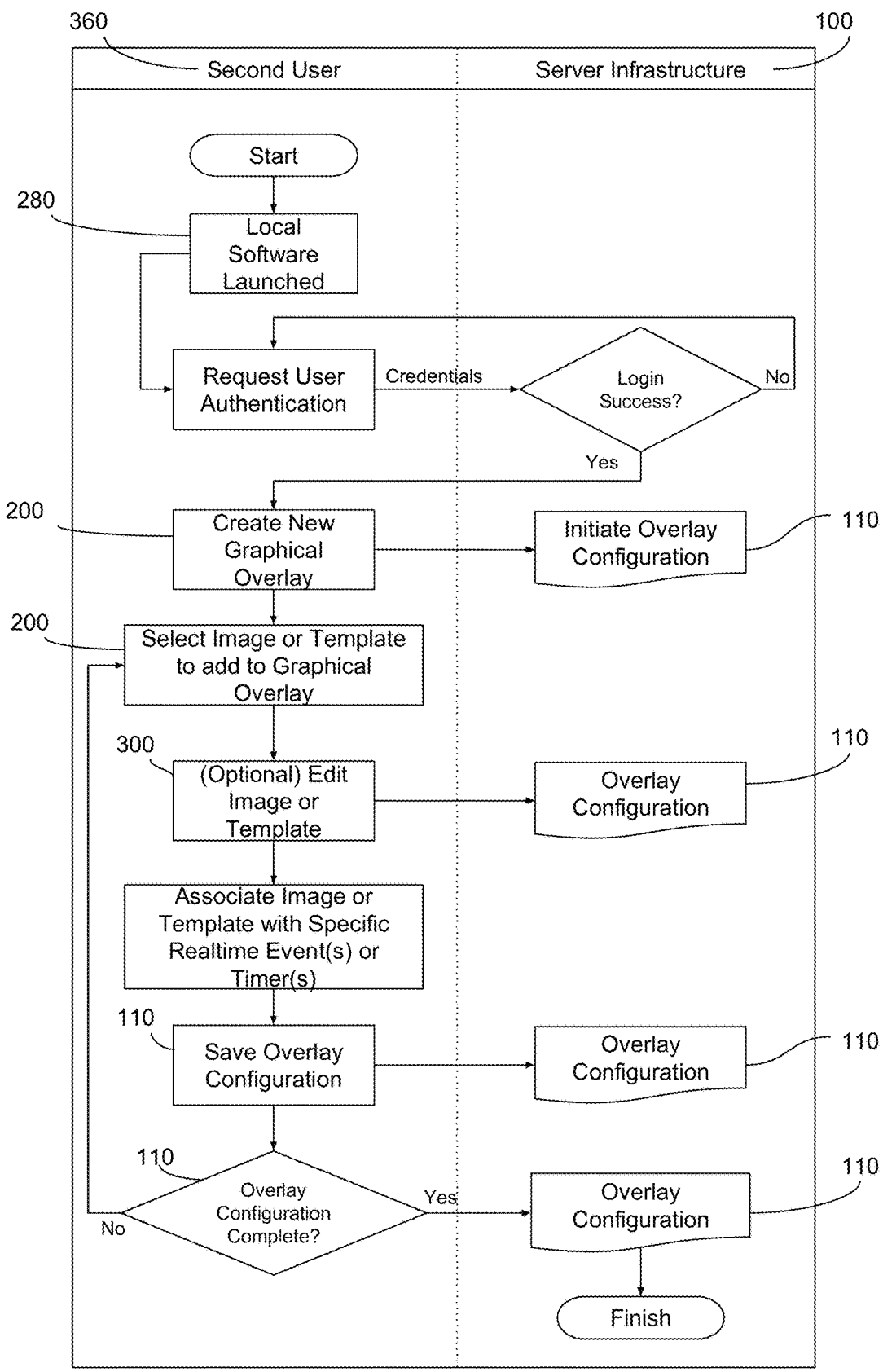
FIG. 2 shows a software flowchart of a system for configuring a multimedia overlay.

FIG. 2 shows an illustrative process view of a user configuring their Graphical Overlay 200.

A User 350 launches the Local Software 280. The Local Software 280 may be executed by any type of a Local Computer 230, and it may be presented as a web page or a local application. The User 350 then uses the Local Software 280 to authenticate with the Server Infrastructure 100. Credentials are then passed from the Local Software 280 to the Server Infrastructure 100, which validates the authentication attempt.

Once authenticated, the User 350 then uses the Local Software 280 to create a new Graphical Overlay 200, which saves a new copy of the Overlay Configuration 110 in the Server Infrastructure 100. The User 350 then selects Images 300 or a Templates 290 to add the Graphical Overlay 200. The User 350 then has the option to edit the Image 300 or Template 290, which updates the Overlay Configuration 110 in their account.

In some embodiments, the User 350 then associates the Image 300 or Template 290 with specific real-time event(s). In another embodiment, the User 350 then associates the Image 300 or Template 290 with timer(s). In another embodiment, the User 350 has already associated the Image 300 or Template 290 with specific real-time event(s), so the User 350 either verifies or modifies the existing associations. In yet another embodiment, the User 350 associates different real-time event(s) from different Streaming Services 150 with different Images 300 or Templates 290, which are then saved to Overlay Configuration(s) 110 that correspond to one or more Streaming Service 150. Once the User 350 makes any of the aforementioned modifications, the Overlay Configurations 110 is updated in their account.

The User 350 determines whether the Graphical Overlay 200 is complete. If not, the User 350 repeats the process of adding Images 300 or Templates 290 to the Graphical Overlay 200. If so, the final Overlay Configuration 110 is saved to the user's account for later retrieval.

Graphical Overlay

Figure 3:
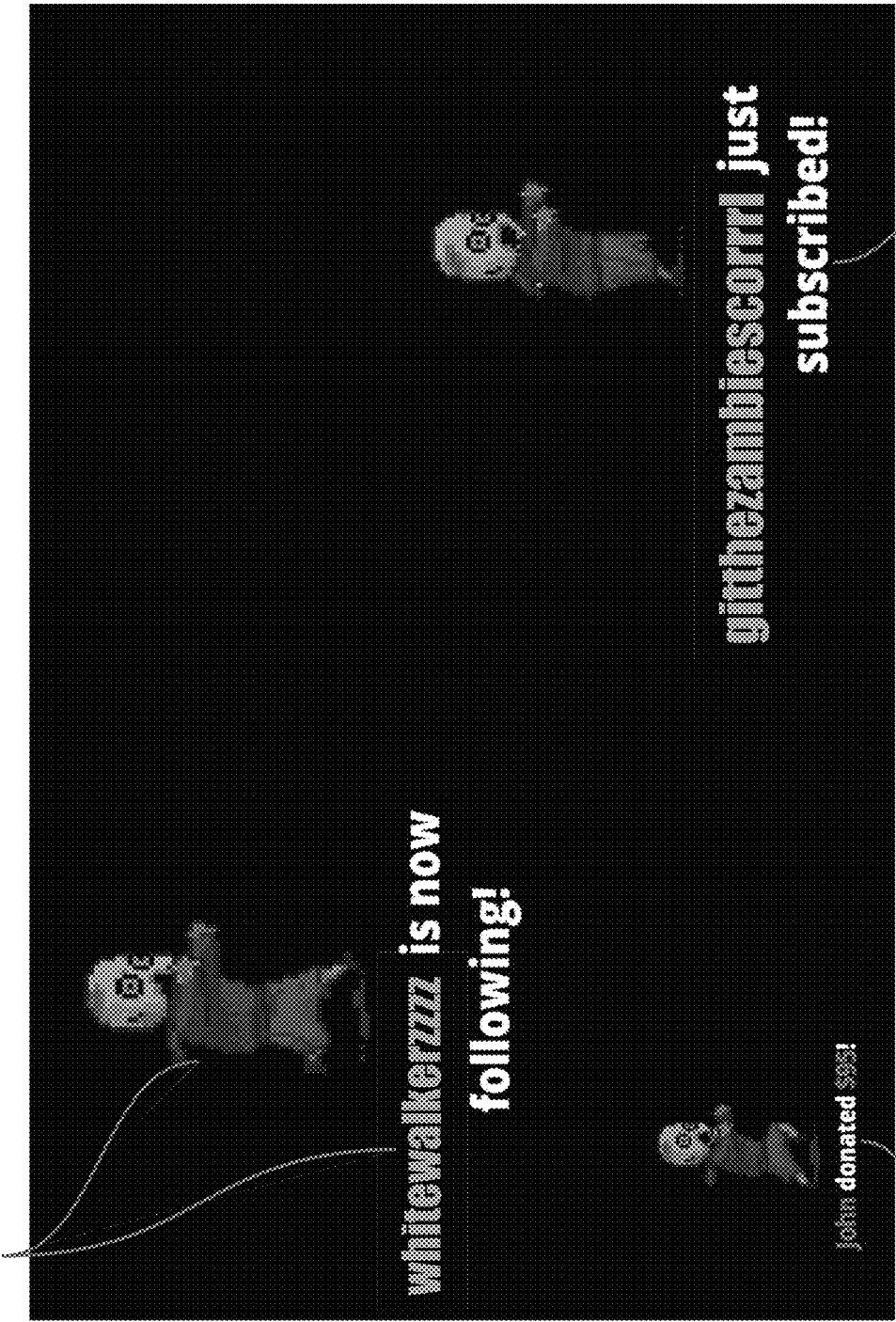
FIG. 3 shows a non-limiting example of a configured multimedia overlay.

FIG. 3 is a non-limiting example of a configured graphical overlay, according to some embodiments. In some embodiments, Images 300 and Templates 290 within the Graphical Overlay 200 are configured to appear when the Streaming Service API(s) 130 report specific events including. The notifications can include, but are not limited to:

1. A Viewer 170 has followed the User 350, meaning they will receive notifications from the Streaming Service when the User's 350 broadcast is active.
2. A Viewer 170 has subscribed to the User's 350 channel. When a Viewer 170 subscribes to a streamer's channel, they pay a monthly subscription fee in exchange for subscriber-only privileges, such as access to subscriber-only interactions with the User 350 and their channel, or access to the User's 350 private chat servers or newsletters. The benefits are configured by the User 350, therefore are not limited to nor required to include the aforementioned benefits.
3. A Viewer 170 has donated money to the User 350. While Streaming Services 150 provide the infrastructure for Viewers 170 to subscribe or follow the User 350, monetary donations are usually facilitated by third-party services, such as Streamlabs.

In the non-limiting example illustrated in FIG. 3, a Follower Notification 390 comprises a predetermined animation and text conveying that a Viewer 170, in this case "whitewalkerzzzz", has followed the User 350. The Donation Notification 400 also comprises a predetermined animation and text conveying that a Viewer 170, in this case "John", has donated, in this case, $95 to the User 350. The Subscription Notification 410 also comprises a predetermined animation and text conveying that a Viewer 170, in this case "gitthezambiescorrrl", has subscribed to the User's 350 channel.

The aforementioned are non-limiting examples of Images 300 being written to a Graphical Overlay 200 image file in response to specific Streaming Service API 130 data points. Said Graphical Overlay 200 image file will be subsequently retrieved by the User's 350 Local Broadcast Software 240, where, per the example provided in FIG. 1A, FIG. 1B, and FIG. 2, it will be combined with the Game Signal 220 and optionally the User Signal 210 by the Video Encoder 190 to produce an encoded video file. In the non-limiting example illustrated in FIG. 3, the black background represents a transparent layer, and the Graphical Overlay 200 will appear as if it is "on top" of the video signals provided by the Game Signal 220 and the User Signal 210.

In some embodiments, one or more of the aforementioned examples might include text without an associated Image 300. In other embodiments, one or more of the aforementioned examples might include an Image 300 without text. In other embodiments, one or more Overlay Configuration 110 might correspond to one or more specific Streaming Service 150. Furthermore, while editing the Graphical Overlay 200 the User 350 may assign the position at which each notification appears. In some embodiments, the program automatically recommends the position for the User 350, which the User 350 can adjust. The User 350 may also change the font, the font colors, the animation included, the duration, transitions, and a wide range of additional configuration options to personalize their Graphical Overlay 200.

Connecting Streaming Services to the User's Account

Figure 4:
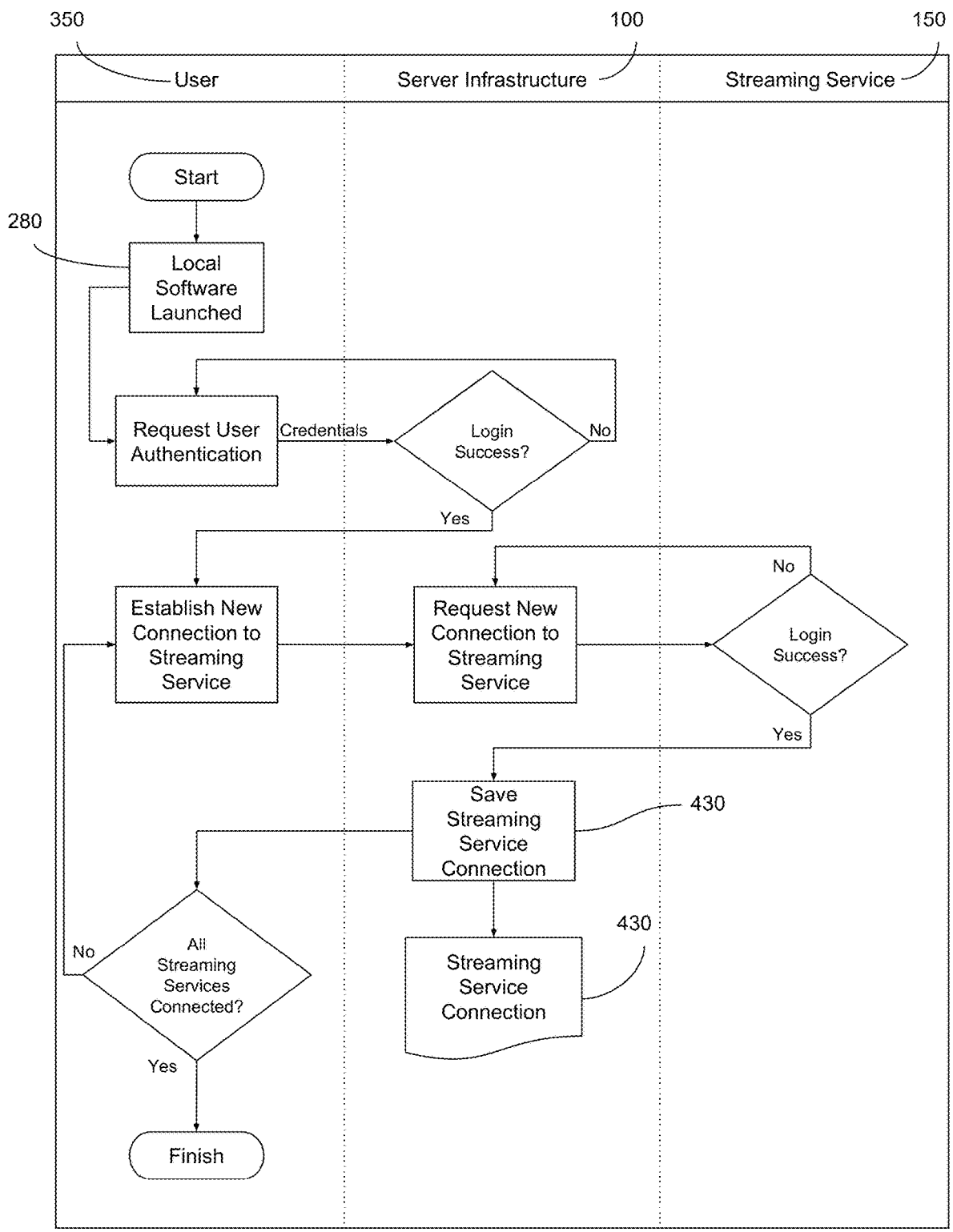
FIG. 4 shows a software flowchart of a user connecting their account to streaming services.

FIG. 4 shows an illustrative process view of a user connecting their account to one or more streaming services.

A User 350 launches the Local Software 280. The Local Software 280 may be executed by any type of a Local Computer 230, and it may be presented as a web page or a local application. The User 350 then uses the Local Software 280 to authenticate with the Server Infrastructure 100. Credentials are then passed from the Local Software 280 to the Server Infrastructure 100, which validates the authentication attempt.

Once authenticated, the User 350 chooses to establish a new connection to a Streaming Service 150 using the Local Software 280. The Server Infrastructure 100 provides an interface for connecting the new Streaming Service. Credentials are then passed from the User 350 to the third-party Streaming Service 150 via the Server Infrastructure 100. Once authenticated, the Server Infrastructure 100 stores and associates the Streaming Service Connection 430 with the User's 350 account within the Server Infrastructure 100.

After the Streaming Service Connection 430 has been saved, the User 350 decides whether they are finished connecting Streaming Services 150 to their account. If not, they repeat the process of connecting a new Streaming Service 150 to their account. Otherwise, the process is complete.

First Illustrative Embodiment

Figure 5A:
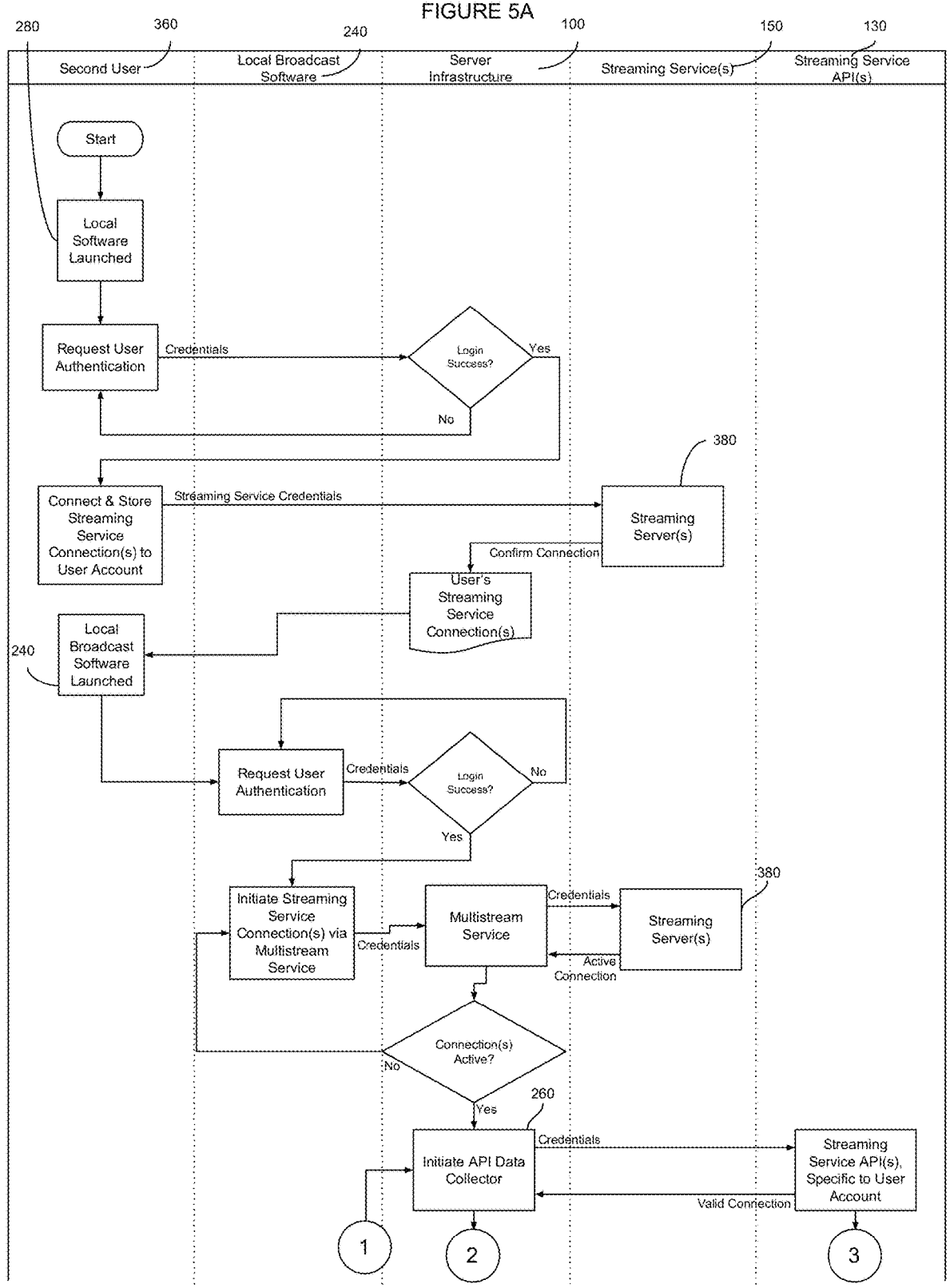
FIGS. 5A and 5B shows a software flowchart and functional distribution for a first illustrative embodiment.
Figure 5B:
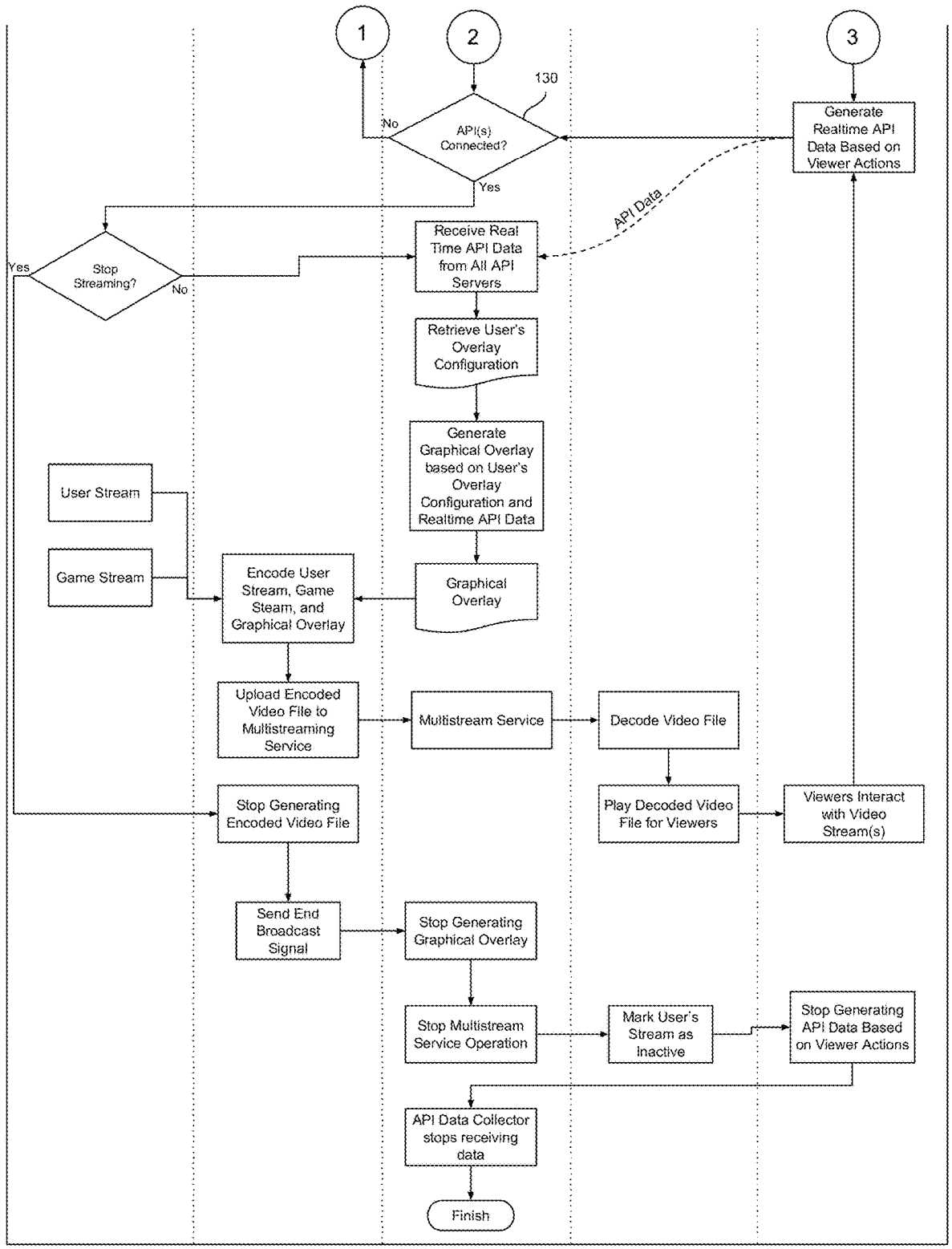

FIGS. 5A and 5B shows a beginning-to-end illustrative process view of the disclosed methods, wherein the streaming architecture uses a Multistream Service 250 and the Graphical Overlay 200 is encoded by the Local Broadcast Software 240.

A User 350 launches the Local Software 280. The Local Software 280 may be executed by any type of a Local Computer 230, and it may be presented as a web page or a local application. The User 350 then uses the Local Software 280 to authenticate with the Server Infrastructure 100. Credentials are then passed from the Local Software 280 to the Server Infrastructure 100, which validates the authentication attempt.

Once authenticated, the User 350 uses the Local Software 280 to connect one or more Streaming Service 150 to the Server Infrastructure 100. The Streaming Service 150 connection(s) are then stored in the User's 350 account for later access via the Multistream Service 250.

The User 350 then launches the Local Broadcast Software 240. The User 350 uses the Local Broadcast Software to authenticate with the Server Infrastructure 100. Credentials are then passed from the Local Broadcast Software 240 to the Server Infrastructure 100, which validates the authentication attempt.

Once authenticated, the User 350 initiates connection(s) with the Streaming Service(s) 150. The User's 350 credentials or API tokens are passed to the Streaming Server(s) 380 via the Multistream Service 250, and the Streaming Server(s) 380 return an active connection to the Multistream Service 250. Once the connection(s) are returned, the Server Infrastructure 100 initiates the API Data Collector 260, which initiates and maintains connections with the Streaming Service API(s) 130. The API Data Collector 260 then begins reading data related to the User's 350 channel(s) for each of the Streaming Service(s) 150 to which the User 350 has active connections. The Streaming Service API(s) 130 then reject the API Data Collector's 260 connection attempts or confirm that the connection(s) are valid. If the connections are rejected, the API Data Collector 260 attempts to initiate the connection to the Streaming Service API(s) 130 again. If the connections are valid, the API Data Collector 260 begins receiving real-time data events from the Streaming Service API(s) 130.

The Server Infrastructure 100 then retrieves the User's 350 Overlay Configuration 110, which contains one or more Image(s) 300 or Template(s) 290. The Server Infrastructure 100 then uses the Overlay Configuration 110 and data from the API Data Collector 260 to begin generating the Graphical Overlay 200 image file. Variations in the generated Graphical Overlay 200 typically consist of animations, Images 300 or Templates 290 that are configured to appear when the Server Infrastructure receives specific data events from the API Data Collector 260. Variations can also consist of Images 300 that remain static until manually changed by the User 350. The Graphical Overlay 200 is then generated at regular intervals for as long as the User's 350 streaming session is active.

The Local Broadcast Software 240 then collects the user's Game Signal 220, User Signal 210, and retrieves the generated Graphical Overlay 200 from the Server Infrastructure 100. The sources are then encoded by the Video Encoder 190 and uploaded to the Multistream Service 250 using a Streaming Protocol 180, including but not limited to HLS, FLV, RTMP, RTSP, and DASH. The Multistream Service 250 then uploads the file using a Streaming Protocol 180 to each of the active Streaming Service Connections 430 in the User's 350 account. Once uploaded to each of the Streaming Service(s) 150, the encoded video file is decoded and played for Viewers 170 to consume.

In other embodiments, the Multistream Service 250 decodes the video file, then uses a Video Encoder 190 to re-encode a copy of the video file in a manner that is optimized for each of the Streaming Service(s) 150 prior to uploading it to the Streaming Service(s) 150 using a Streaming Protocol 180.

As Viewers 270 interact with the User's 350 channel(s) on the various Streaming Service(s), the Streaming Service API(s) 130 record the interactions and convert them into a data format that can be easily shared with the API Data Collector 260. Interactions include but are not limited to: chat, subscriptions, follows, donations, minigames, and miscellaneous purchases.

In some embodiments, Alternative API Data Sources 270, data from sources other than the Streaming Service API(s) 130, may send data to the API Data Collector 260 for use in creating Graphical Overlays 200.

The aforementioned process of encoding the sources to playback repeats until the User 350 decides to stop the broadcast. When the broadcast is stopped, the Local Broadcast Software 240 stops generating and uploading the encoded video file; it then sends a signal to end the broadcast, the Server Infrastructure 100 stops generating the Graphical Overlay 200, the Multistream Service 250 stops operation and notifies the Streaming Service(s) 150 to mark the User's 350 stream(s) as inactive, the Streaming Service API(s) 130 stop generating data based on Viewer 170 actions, and the API Data Collector 260 stops receiving data.

Second Illustrative Embodiment

Figure 6A:
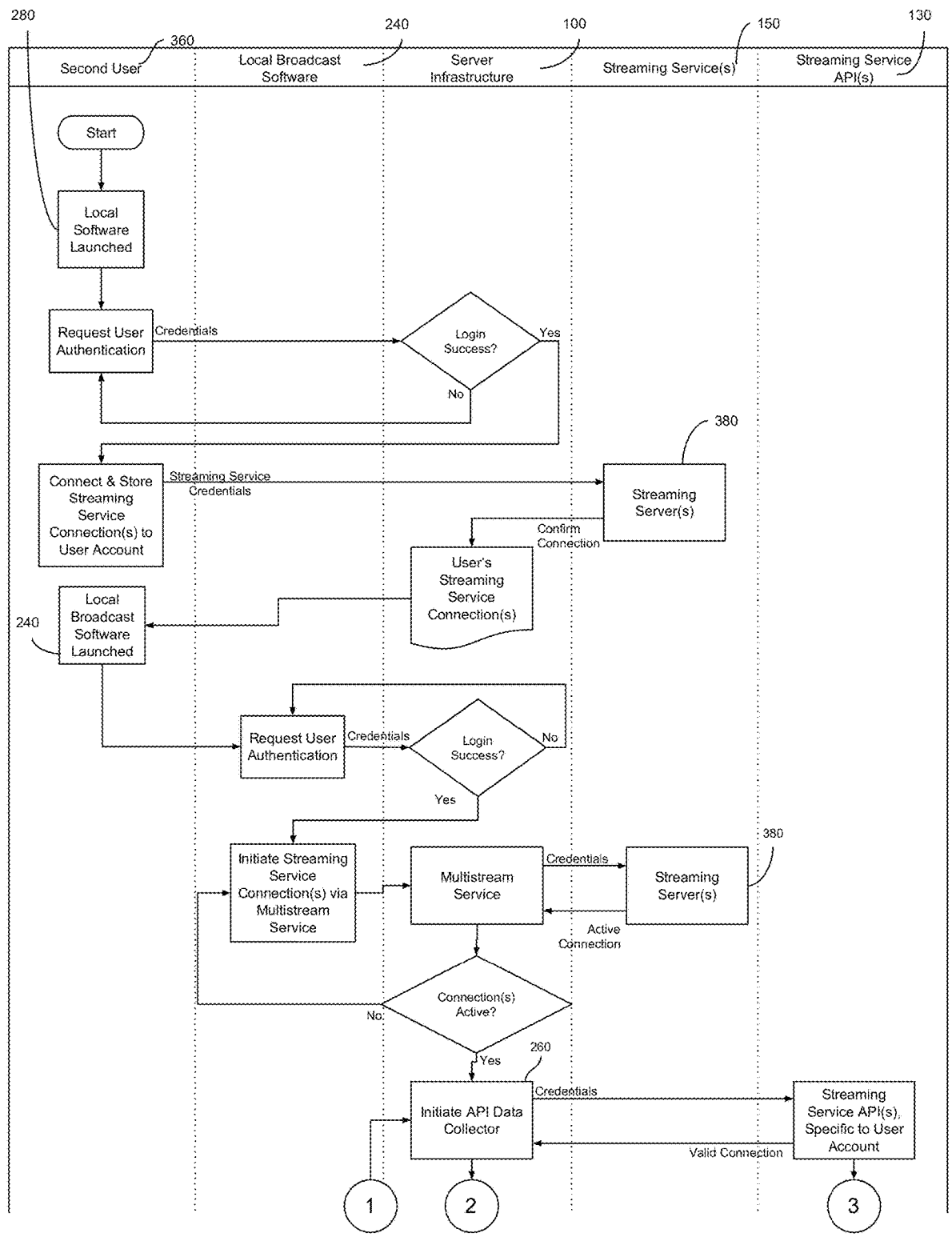
FIGS. 6A and 6B shows a software flowchart and functional distribution for a second illustrative embodiment.
Figure 6B:
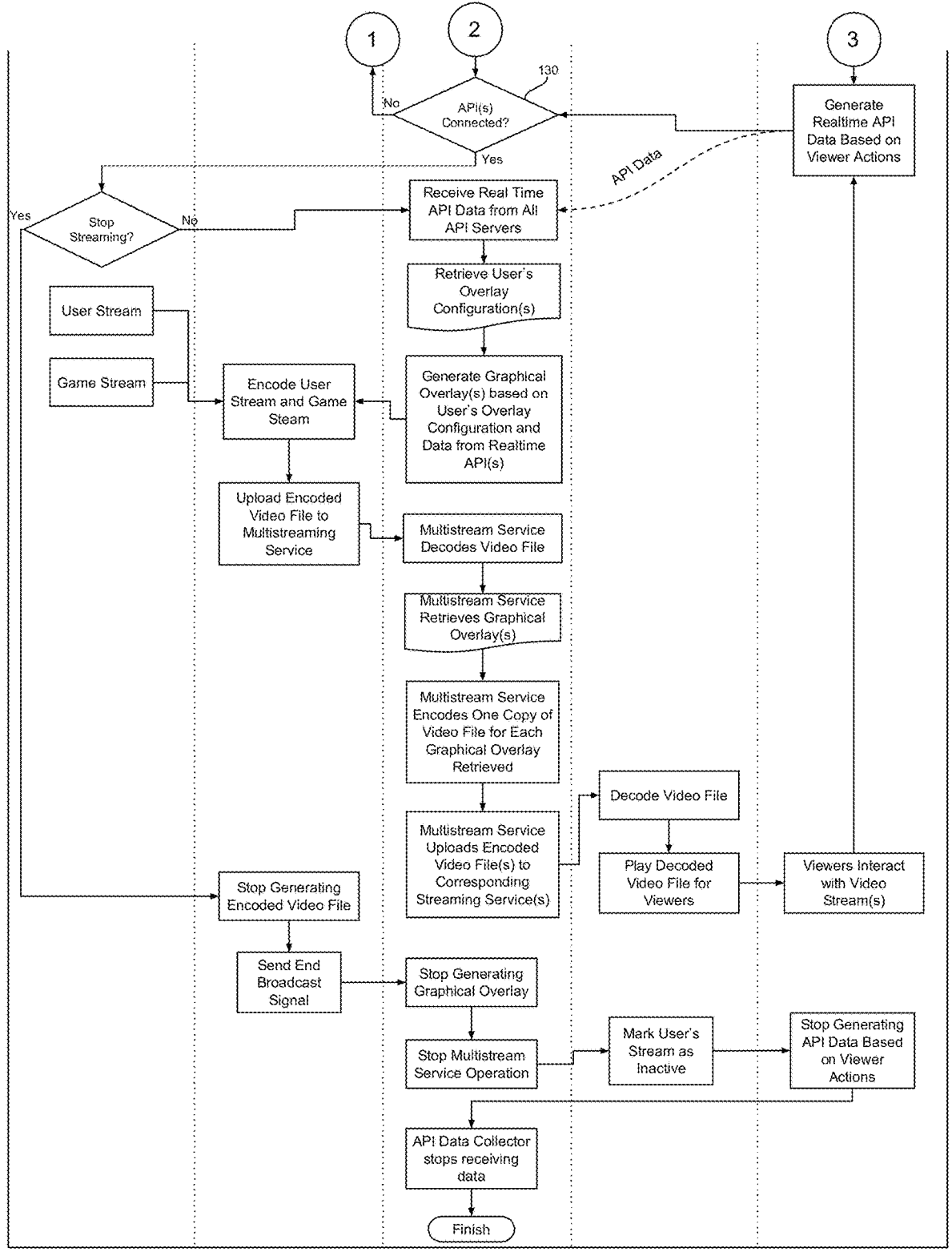

FIGS. 6A and 6B shows a beginning-to-end illustrative process view of the disclosed methods, wherein the streaming architecture uses a Multistream Service 250 and one or more Graphical Overlays 200 are added and encoded by the Multistream Service 250, which uploads a copy of the video to the Streaming Services 150 corresponding to each copy of the Graphical Overlay 200.

A User 350 launches the Local Software 280. The Local Software 280 may be executed by any type of a Local Computer 230, and it may be presented as a web page or a local application. The User 350 then uses the Local Software 280 to authenticate with the Server Infrastructure 100. Credentials are then passed from the Local Software 280 to the Server Infrastructure 100, which validates the authentication attempt.

Once authenticated, the User 350 uses the Local Software 280 to connect one or more Streaming Service 150 to the Server Infrastructure 100. The Streaming Service 150 connection(s) are then stored in the User's 350 account for later access via the Multistream Service 250.

The User 350 then launches the Local Broadcast Software 240. The User 350 uses the Local Broadcast Software to authenticate with the Server Infrastructure 100. Credentials are then passed from the Local Broadcast Software 240 to the Server Infrastructure 100, which validates the authentication attempt.

Once authenticated, the User 350 initiates connection(s) with the Streaming Service(s) 150. The User's 350 credentials or API tokens are passed to the Streaming Server(s) 380 via the Multistream Service 250, and the Streaming Server(s) 380 return an active connection to the Multistream Service 250. Once the connection(s) are returned, the Server Infrastructure 100 initiates the API Data Collector 260, which initiates and maintains connections with the Streaming Service API(s) 130. The API Data Collector 260 then begins reading data related to the User's 350 channel(s) for each of the Streaming Service(s) 150 to which the User 350 has active connections. The Streaming Service API(s) 130 then reject the API Data Collector's 260 connection attempts or confirm that the connection(s) are valid. If the connections are rejected, the API Data Collector 260 attempts to initiate the connection to the Streaming Service API(s) 130 again. If the connections are valid, the API Data Collector 260 begins receiving real-time data events from the Streaming Service API(s) 130.

The Server Infrastructure 100 then retrieves the User's 350 Overlay Configuration(s) 110, which contains one or more Image(s) 300 or Template(s) 290 and correspond to one or more Streaming Service(s) 150. The Server Infrastructure 100 uses the Overlay Configuration(s) 110 and data from the API Data Collector 260 specific to each Streaming Service 150 to begin generating one or more Graphical Overlay 200 image file(s) based on data received from and corresponding to each of the Streaming Service(s) 150. The result is a Graphical Overlay 200 that contains Images 300 generated in response to data specifically related to the associated Streaming Service 150, as opposed to a one Graphical Overlay 200 that generates images based on data received from all of the Streaming Services 150.

Variations in the generated Graphical Overlay 200 typically consist of animations, Images 300 or Templates 290 that are configured to appear when the Server Infrastructure receives specific data events from the API Data Collector 260. Variations can also consist of Images 300 that remain static until manually changed by the User 350. The Graphical Overlay 200 is then generated at regular intervals for as long as the User's 350 streaming session is active.

The Local Broadcast Software 240 then collects the user's Game Signal 220 and User Signal 210. The sources are then encoded by the Video Encoder 190 and uploaded to the Multistream Service 250 using a Streaming Protocol 180, including but not limited to HLS, FLV, RTMP, RTSP, and DASH. The Multistream Service 250 then retrieves the Graphical Overlay 200 image file(s), decodes the encoded stream for the video file, makes one copy of the decoded video file for each Graphical Overlay 200 image file, and re-encodes (i.e. transcodes) the original video file to include the Graphical Overlay 200 image file. The Multistream Service 250 uploads each video file using a Streaming Protocol 180 to each of the active and corresponding Streaming Service Connections 430 in the User's 350 account. Once uploaded to each of the Streaming Service(s) 150, the encoded video file is decoded and played for Viewers 170 to consume.

In other embodiments, the Multistream Service 250 decodes the video file, duplicates the video file, inserts the Graphical Overlay 200 image file, then uses a Video Encoder 190 to re-encode a copy of the video file in a manner that is optimized for each of the Streaming Service(s) 150 prior to uploading it to the Streaming Service(s) 150 using a Streaming Protocol 180.

In other embodiments, the Multistream Service 250 duplicates the video file prior to decoding.

In other embodiments, the Multistream Service 250 optimizes the video file based on meta-data related to the video file.

As Viewers 270 interact with the User's 350 channel(s) on the various Streaming Service(s), the Streaming Service API(s) 130 record the interactions and convert them into a data format that can be easily shared with the API Data Collector 260. Interactions include but are not limited to: chat, subscriptions, follows, donations, minigames, and miscellaneous purchases.

In some embodiments, Alternative API Data Sources 270, data from sources other than the Streaming Service API(s) 130, may send data to the API Data Collector 260 for use in creating Graphical Overlays 200.

The aforementioned process of encoding the sources to playback repeats until the User 350 decides to stop the broadcast. When the broadcast is stopped, the Local Broadcast Software 240 stops generating and uploading the encoded video file; it then sends a signal to end the broadcast, the Server Infrastructure 100 stops generating the Graphical Overlay 200, the Multistream Service 250 stops operation and notifies the Streaming Service(s) 150 to mark the User's 350 stream(s) as inactive, the Streaming Service API(s) 130 stop generating data based on Viewer 170 actions, and the API Data Collector 260 stops receiving data.

What is claimed:

1. A system comprising:
   one or more processors; and
   one or more machine-readable, non-transitory storage mediums that include instructions configured to cause the one or more processors to:
   establish communication with a plurality of streaming services that are configured to receive and transmit information;
   receive, from a client computing platform, video content defined by an image and/or audio captured from the client computing platform associated with a user;
   receive, from a first streaming service of the plurality of streaming services, a first set of viewer input information associated with a first user's interaction with the first streaming service of the plurality of streaming services;
   receive, from a second streaming service of the plurality of streaming services, a second set of viewer input information associated with a second user's interaction with the second streaming service of the plurality of streaming services, wherein the second streaming service is different from the first streaming service;
   responsive to the reception of the first set and the second set of viewer input information, apply a first video overlay to the video content, wherein the first video overlay is based on the first set of viewer input information, and apply a second video overlay to the video content, wherein the second video overlay is based on the second set of viewer input information; and
   provide the plurality of streaming services with the video content,
   wherein the video content for the first streaming service includes the first video overlay and the video content with the first video overlay is only distributed to users associated with the first streaming service, and
   wherein the video content for the second streaming service includes the second video overlay and the video content with the second video overlay is only distributed to users associated with the second streaming service.

2. The system of claim 1, wherein instructions are further configured to cause the one or more processors to: receive, from the client computing platform, a user account information associated with a user, wherein the user account information includes information associating the user account information of the user with the different streaming services.

3. The system of claim 1, wherein the one or more processors are further configured by machine-readable instructions to obtain the video overlays, wherein the video overlays are obtained from non-transitory storage media configured to store overlay content information and overlay configuration information corresponding to video overlays.

4. The system of claim 3, wherein the overlay content information for the given video overlay that defines an image and/or audio of the given video overlay and overlay configuration information for the given video overlay specifies values for one or more settings that define application of the image and/or audio of the given video overlay to the video content.

5. The system of claim 4, wherein the one or more settings that define the application of the image and/or audio of the given video overlay to the video content includes one or more of one or more setting that specify positions of the image of the given video overlay applied to the video content, one or more setting that specify a duration of the image and/or audio of the given video overlay applied to the video content, and/or one or more setting that specify a real-time event trigger defining when the image and/or audio of the given video overlay is applied to the video content.

6. The system of claim 5, wherein the video content includes an image of the user's face, wherein the image of the given video overlay is positioned relative to the user's face based on the one or more settings that define the application of the image and/or audio of the given video overlay to the video content.

7. The system of claim 1, wherein the plurality of streaming services are each hosted on different servers.

8. A method comprising:
   establishing communication with a plurality of streaming services that are configured to receive and transmit information;
   receiving, from a client computing platform, video content defined by an image and/or audio captured from the client computing platform associated with a user;
   receiving, from a first streaming service of the plurality of streaming services, a first set of viewer input information associated with a first user's interaction with the first streaming service of the plurality of streaming services;
   receiving, from a second streaming service of the plurality of streaming services, a second set of viewer input information associated with a second user's interaction with the second streaming service of the plurality of streaming services, wherein the second streaming service is different from the first streaming service;
   responsive to the reception of the first set and the second set of viewer input information:
   applying a first video overlay to the video content, wherein the first video overlay is based on the first set of viewer input information; and
   applying a second video overlay to the video content, wherein the second video overlay is based on the second set of viewer information; and
   providing the plurality of streaming services with the video content,
   wherein the video content for the first streaming service includes the first video overlay and the video content with the first video overlay is only distributed to users associated with the first streaming service including the first user, and
   wherein the video content for the second streaming service includes the second video overlay and the video content with the second video overlay is only distributed to users associated with the second streaming service including the second user.

9. The method of claim 8, further comprising:
receiving, from the client computing platform, a user account information associated with a user, wherein the user account information includes information associating the user account information of the user with the different streaming services.

10. The method of claim 8, wherein the method further includes obtaining the video overlays, wherein the video overlays are obtained from non-transitory storage media configured to store overlay content information and overlay configuration information corresponding to video overlays.

11. The method of claim 10, wherein the overlay content information for the given video overlay that defines an image and/or audio of the given video overlay and overlay configuration information for the given video overlay specifies values for one or more settings that define application of the image and/or audio of the given video overlay to the video content.

12. The method of claim 11, wherein the one or more settings that define the application of the image and/or audio of the given video overlay to the video content includes one or more of one or more setting that specify positions of the image of the given video overlay applied to the video content, one or more setting that specify a duration of the image and/or audio of the given video overlay applied to the video content, and/or one or more setting that specify a real-time event trigger defining when the image and/or audio of the given video overlay is applied to the video content.

13. The method of claim 12, wherein the video content includes an image of the user's face, wherein the image of the given video overlay is positioned relative to the user's face based on the one or more settings that define the application of the image and/or audio of the given video overlay to the video content.

14. The method of claim 8, wherein the streaming services are each hosted on different servers.

* * * * *